(12) United States Patent
Fan et al.

(10) Patent No.: US 11,171,501 B2
(45) Date of Patent: Nov. 9, 2021

(54) DIVIDER CIRCUIT FOR PARALLEL CHARGING

(71) Applicant: Integrated Device Technology, Inc., San Jose, CA (US)

(72) Inventors: Siqiang Fan, Foothill Ranch, CA (US); Sercan Ipek, San Jose, CA (US); Eric Huang, San Jose, CA (US); Turev Acar, San Jose, CA (US)

(73) Assignee: Integrated Device Technology, Inc., San Jose, CA (US)

(*) Notice: Subject to any disclaimer, the term of this patent is extended or adjusted under 35 U.S.C. 154(b) by 182 days.

(21) Appl. No.: 16/368,788

(22) Filed: Mar. 28, 2019

(65) Prior Publication Data

US 2020/0212702 A1 Jul. 2, 2020

Related U.S. Application Data

(60) Provisional application No. 62/787,008, filed on Dec. 31, 2018.

(51) Int. Cl.
*H02J 7/00* (2006.01)
*H02M 3/07* (2006.01)
*H02J 7/02* (2016.01)

(52) U.S. Cl.
CPC ............ *H02J 7/0072* (2013.01); *H02J 7/025* (2013.01); *H02M 3/07* (2013.01)

(58) Field of Classification Search
CPC .......... H02J 7/0072; H02J 7/025; H02M 3/07
USPC ...................................................... 320/107
See application file for complete search history.

(56) References Cited

U.S. PATENT DOCUMENTS

| | | | |
|---|---|---|---|
| 2012/0242309 A1* | 9/2012 | Korzeniowski ....... | H02M 3/158 323/282 |
| 2013/0222052 A1* | 8/2013 | Gakhar .................. | G05F 1/575 327/539 |
| 2015/0280573 A1* | 10/2015 | Gong ................ | H02M 3/33507 363/21.14 |
| 2017/0300078 A1* | 10/2017 | Puggelli ................... | H02J 7/00 |
| 2018/0041060 A1* | 2/2018 | Walley ................ | H02J 7/00045 |
| 2018/0309315 A1* | 10/2018 | Der ......................... | H02J 50/80 |
| 2020/0381994 A1* | 12/2020 | Choi ....................... | H02M 3/06 |

* cited by examiner

*Primary Examiner* — Suchin Parihar
(74) *Attorney, Agent, or Firm* — Haynes and Boone, LLP

(57) ABSTRACT

Embodiments described herein provides a battery charging circuit that boosts an input current and feeds the boosted input current to a battery for fast charging. Specifically, the battery charging circuit includes a low dropout regulator (LDO) for providing a voltage, a switch mode charger, coupled between the LDO and a battery, and a capacitor divider, coupled between the LDO and the battery, in parallel to the switch mode charger, for dividing the voltage outputted from the LDO by a factor.

20 Claims, 6 Drawing Sheets

DIVIDER CIRCUIT FOR PARALLEL CHARGING

CROSS-REFERENCE

This application claims the benefit, under 35 U.S.C. § 119(e), of commonly-owned U.S. provisional application No. 62/787,008, filed on Dec. 31, 2018, which is hereby expressly incorporated herein by reference.

TECHNICAL FIELD

Embodiments of the present invention are related to charging systems and, in particular, to divided by four circuit with parallel charging.

DISCUSSION OF RELATED ART

Mobile devices, for example smart phones, tablets, wearables and other devices are increasingly using wireless power charging systems. In general, wireless power transfer involves a transmitter driving a transmitter coil and a receiver with a receiver coil placed proximate to the transmitter coil. The receiver coil receives the wireless power generated by the transmitter coil and uses that received power to drive a load, for example to provide power to a battery charger. Conventionally, a rectifier circuit coupled to the receiver coil rectifies any alternative current (AC) output from the receiver coil and outputs a direct current (DC) voltage to the battery charger. The output DC current is usually limited by the transferred wireless power divided by the DC voltage, thus the charging speed of the battery charger is limited as well.

Therefore, there is a need for a wireless power charging system for fast charging.

SUMMARY

In view of the charging speed issue in a wireless power charging system, embodiments described herein provides a battery charging circuit that boosts an input current and feeds the boosted input current to a battery for fast charging. Specifically, the battery charging circuit includes a low dropout regulator (LDO) for providing a voltage, a switch mode charger, coupled between the LDO and a battery, and a capacitor divider, coupled between the LDO and the battery, in parallel to the switch mode charger, for dividing the voltage outputted from the LDO by a factor.

Embodiments described herein provides a method for regulating a charging voltage for a battery charging circuit. Specifically, a voltage is received, from a LDO. A controller determines whether a switch mode charger coupled between the LDO and the battery is switched on. When the switch mode charger is off, a capacitor divider is on and divides the voltage by a factor, and then feeds a current that is the average input current from the LDO multiplied by the factor to the battery.

These and other embodiments are discussed below with respect to the following figures.

These diagrams are further discussed below.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description illustrates inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Figure 2:
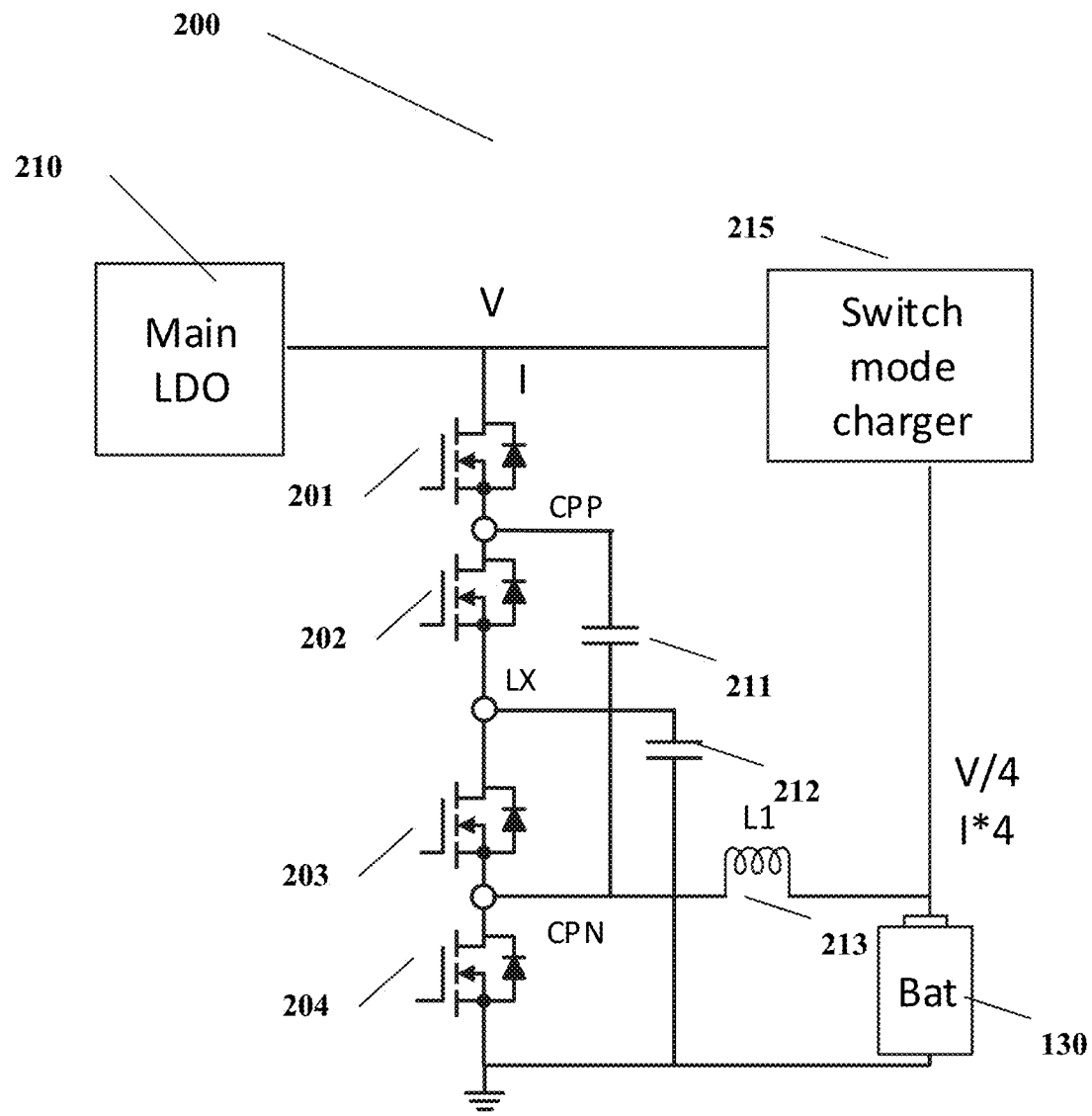
FIG. 2 illustrates an example circuit structure of the circuit divider shown in FIG. 1, according to some embodiments.

Embodiments of the present invention provide for a parallel charging solution with a divider circuit working in parallel with a switch mode charger, as further illustrated in FIG. 2. Embodiments include a charging chip with a current limited low drop out regulator (LDO) and a capacitor divider. For example, the capacitor divider can operate as a divided by 4 circuit. The input voltage from the LDO is divided by 4, and thus the output current is boosted 4 times the input current. In this way, the higher output current is then fed to the battery for fast charging.

Figure 1:
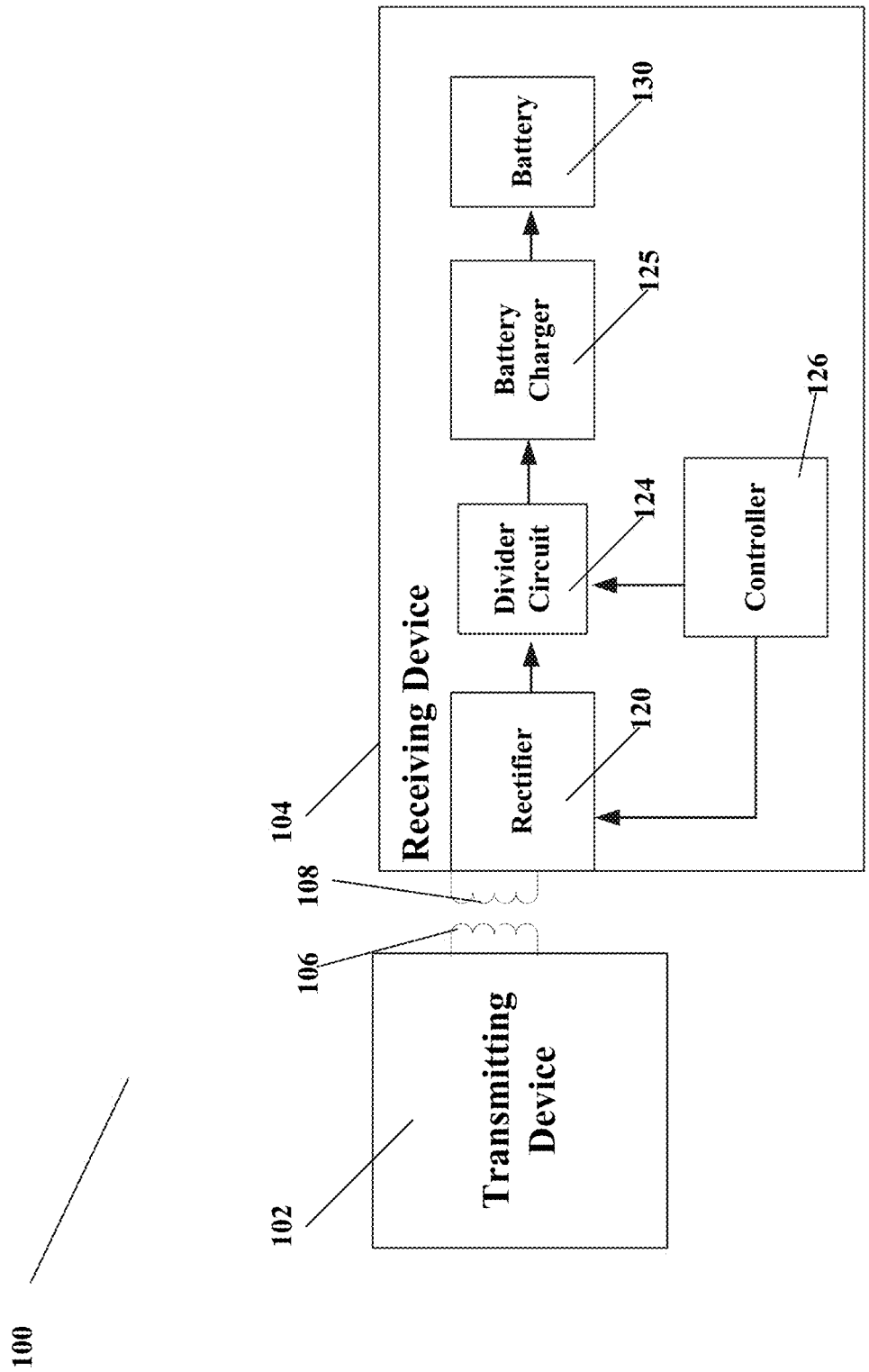
FIG. 1 illustrates an example wireless power system having a divider circuit at the receiving device for fast charging, according to some embodiments.

FIG. 1 illustrates an example wireless power system having a divider circuit at the receiving device for fast charging, according to some embodiments. As illustrated in FIG. 1, a transmitting device 102 transfers wireless power to a receiving device 104. Transmitting device 102 is coupled to a transmitter coil 106, which generates a time-varying electromagnetic field. In this way, the transmitter coil 106 transfers power to the receiver coil 108 coupled to the receiving device 104 via electromagnetic induction.

The receiver coil 108 is coupled to the receiving device 104. A rectifier circuit 120 within the receiving device 104 receives and rectifies wireless power received at the receiver coil 108, and then in turn provides an output voltage for battery charging. A divider circuit 124 can be coupled to the rectifier 120 to divide the rectified voltage from the rectifier circuit 120 (e.g., by 4, etc.) and in turn generate a DC current that is multiple times of the current outputted from the rectifier circuit 120. The high DC current can then be fed to the battery charger 125 for fast charging the battery 130. Further detail of the divider circuit 124 is discussed in relation to FIG. 2.

The receiving device 104 further includes a controller 126, which is configured to control the rectifier circuit 120 and the divider circuit 124. For example, the rectifier circuit 120 receives control signals from the controller 126 to convert an AC current from the receiver coil 108 to a DC current. For another example, the controller 126 is configured to control the transistor switches in the divider circuit 124 to generate an alternating output voltage, as further discussed in relation to FIG. 2.

FIG. 2 illustrates an example circuit structure of the circuit divider 124 (a divided-by-4 circuit in this example) in the receiving device 104 shown in FIG. 1, according to some embodiments. The charging circuit 200 can be disposed within the receiving device 104. The charging circuit is powered by a LDO 210 that provides an input voltage V. The charging circuit includes a switch mode charger 215 that is in parallel with a voltage divider circuit that includes four series coupled transistor switches 201-204. Specifically, transistor switch 201 is coupled to transistor switch 202 via a control power positive (CPP) node, transistor switch 202 is coupled to transistor switch 203 via the LX node, and transistor switch 203 is coupled to transistor switch 204 via a control power negative (CPN) node. The voltage divider circuit further includes a capacitor 211 coupled between CPP node and CPN node, and a capacitor 212 coupled between the LX node and ground.

The controller 126 controls transistor switches 201-204 by feeding the same gate voltage to transistor switches 201 and 203, and feeding the opposite or the reversed gate voltage to transistor switches 202 and 204. When the gate voltage that controls both transistor switches 201 and 203 is set, e.g., by controller 126, as zero (or negative), e.g., during a first part of a cycle, transistor switches 201 and 203 are off, and transistor switches 202 and 204 are on. In this case, the CPN node outputs a voltage level of zero (ground). Alternatively, when the gate voltage that controls both transistor switches 201 and 203 is set as positive, e.g., during a second part of the cycle, transistor switches 201 and 203 are on, and transistor switches 202 and 204 are off. In this case, the CPN node outputs a voltage level equivalent to 0.5V.

Thus in this way, the CPN node toggles between 0.5V and ground. The duty cycle is around 50% (of outputting 0.5V) and 50% (of outputting ground), while a deadtime of switching from high to low or from low to high in the transistor switches 201-204 may degrade the duty cycle to a little bit below 50%. Averaging the voltage at CPN node, therefore, provides for a voltage substantially similar to 0.25V, e.g., with a tolerable range of deviation caused by the deadtime of the transistor switches. Consequently, in the example shown in FIG. 2, the capacitor divider operates as a divided-by-4 circuit. For a fast charging application, if the main LDO output current is limited to I, the output current that passes through the inductor 213 will be boosted to a level that is substantially similar to 4I.

In one application case, if inductor 213 is connected to the CPP node, the CPP node outputs a voltage substantially similar to 0.75V on average, and a higher current of 1⅓ I through the inductor for charging battery 130.

In one application case, the switch mode charger 215 is coupled between the main LDO output and the battery 130. For high current charging, the capacitor divider is used to generate a boosted current to the battery 130 (e.g., 4 times the LDO output current in the example). For CV mode light current charging, the switch mode charger 215 is used, while capacitor divider is off. When the switch mode charger 215 feeds the charging current to the battery 130 directly, as the capacitor divider is off, no current goes through the capacitor divider to the battery 130.

Figure 3:
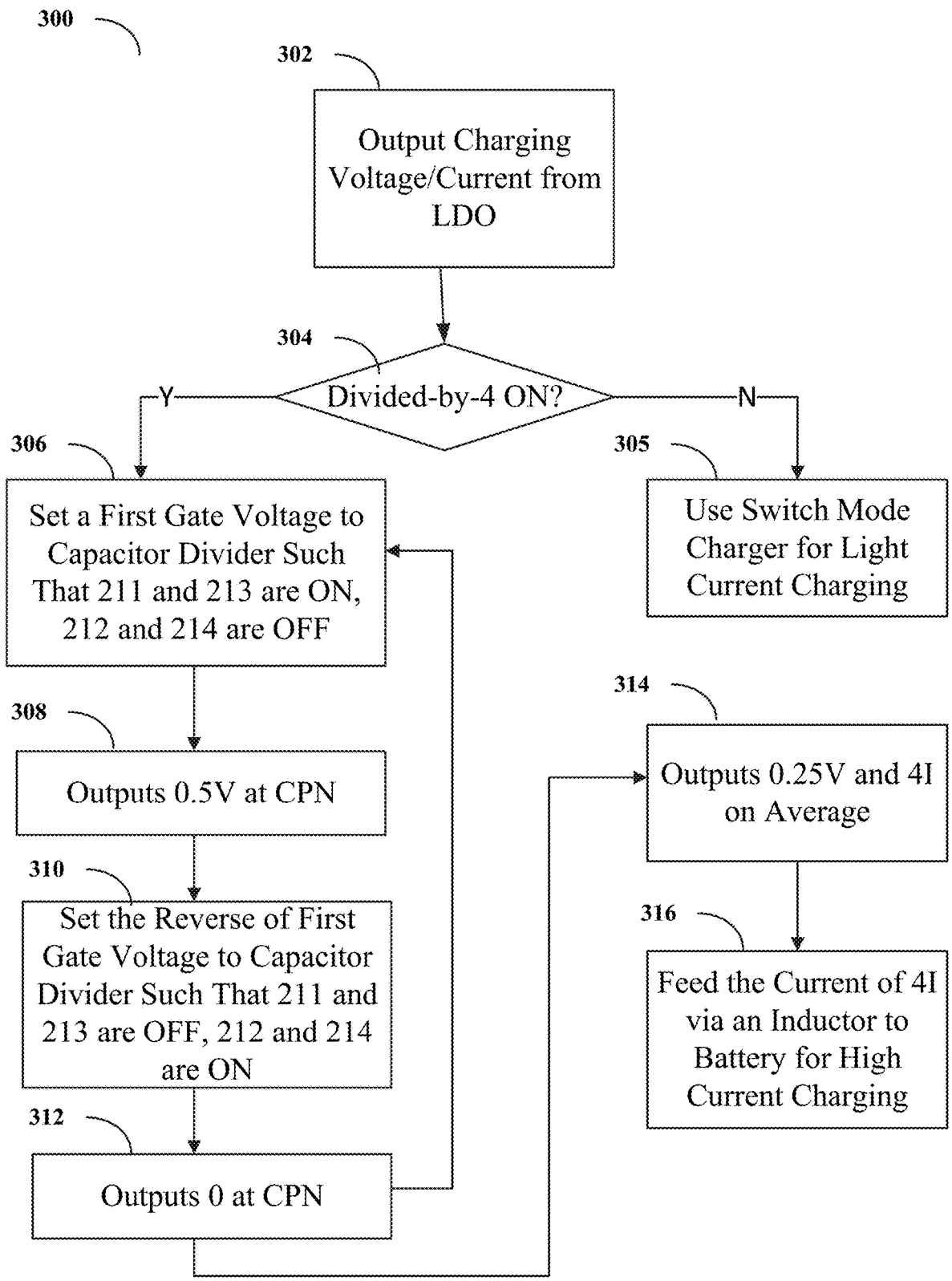
FIG. 3 illustrates an example logic flow diagram illustrating a process of fast charging with the circuit divider shown in FIG. 2, according to some embodiments.

FIG. 3 illustrates an example logic flow diagram illustrating a process 300 of fast charging with the circuit divider shown in FIG. 2, according to some embodiments. At step 302, an output charging voltage V is received from the LDO (210). At step 304, the controller 126 determines whether a switch mode charger 215 coupled between the LDO 210 and the battery 130 is on, or a divider circuit is on. At step 306, when the switch mode charger 215 is off and the divider circuit is on, the controller 126 sets a first gate voltage (e.g., positive) to the capacitor divider such that transistor switches 201 and 203 are on and transistor switches 212 and 214 are off. At step 308, the CPN node outputs a voltage of 0.5V. At step 310, the controller 126 sets a second gate voltage (e.g., zero) to the capacitor divider such that transistor switches 201 and 203 are off and transistor switches 202 and 204 are on. At step 312, the CPN node outputs zero. The controller 126 may repeat 306 and 312 for a number of cycles. At 314, the CPN node outputs a voltage of 0.25V and a current of 4 I on average. At step 316, the current of 4I is fed via an inductor to the battery for high current charging.

At step 304, when the switch mode charger 215 is on and the divider circuit is off, process 300 moves on to step 305, at which the wireless charging circuit uses the switch mode charger for light current charging.

Figure 4:
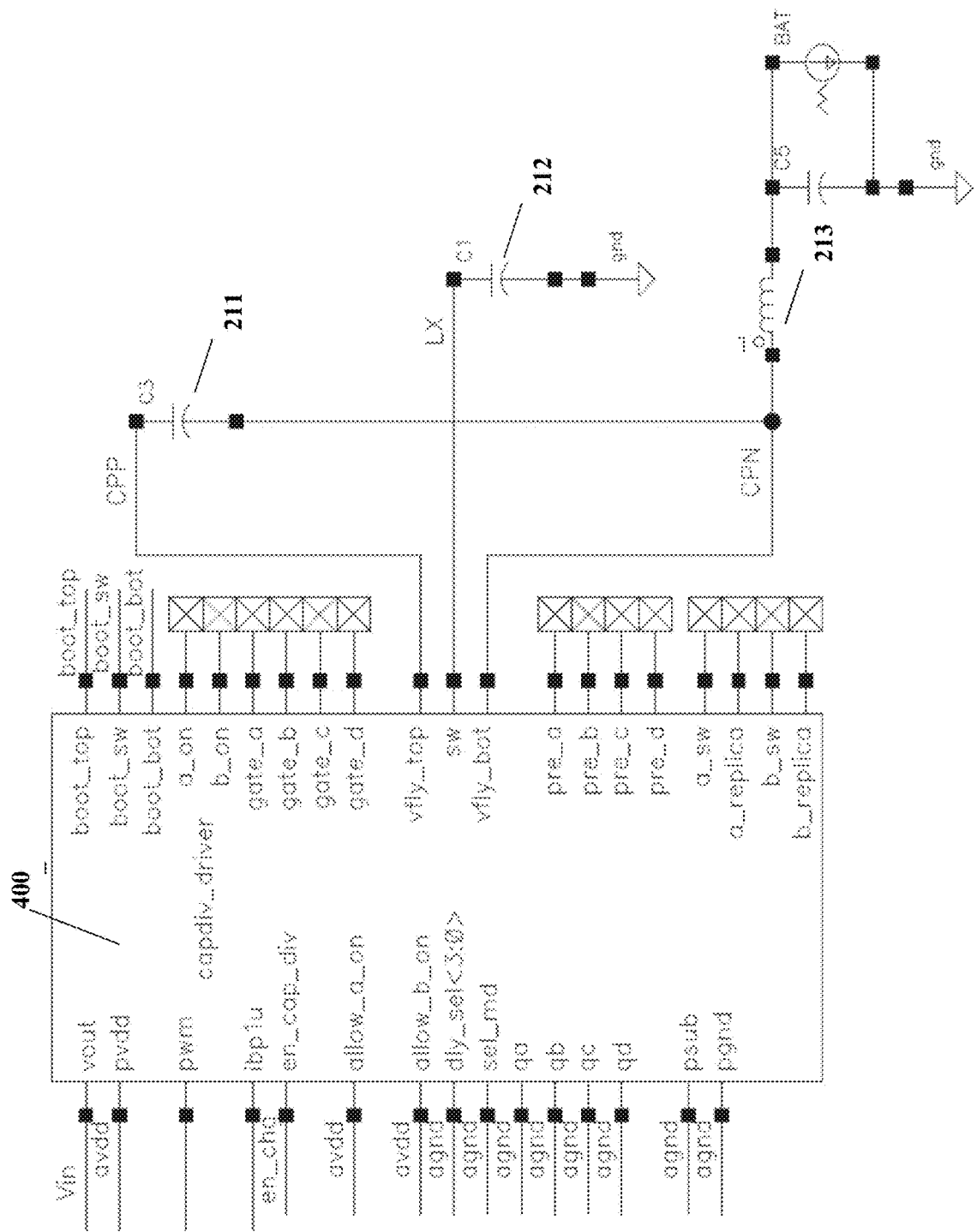
FIG. 4 illustrates an example circuit diagram of a wireless charger system including the circuit divider shown in FIG. 2, according to some embodiments.
Figure 5:
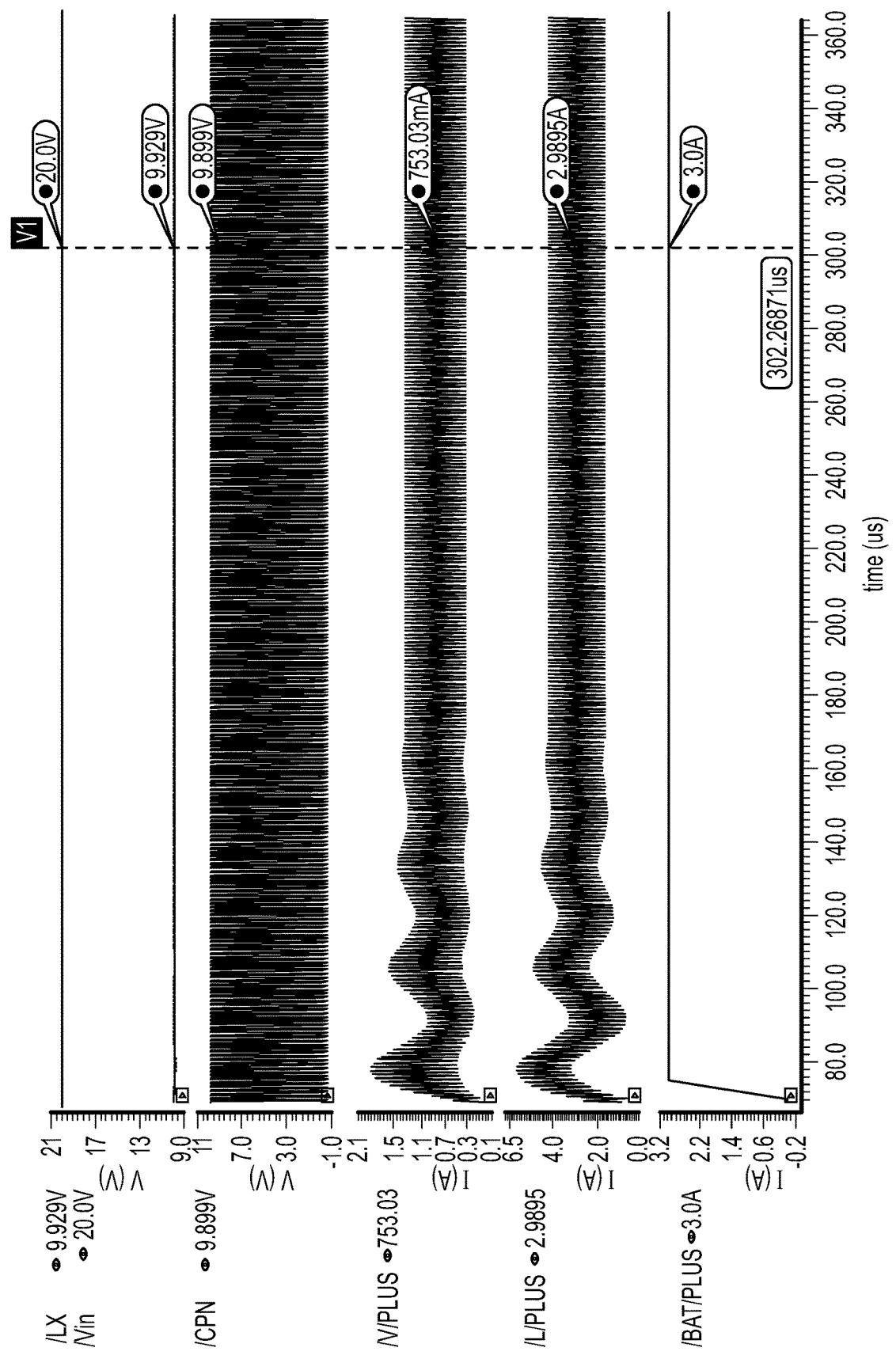
FIG. 5 illustrates a signal diagram illustrating various voltage levels at different pins in the circuit diagram shown in FIG. 4, representing the input and the output of the divider circuit shown in FIG. 2, according to some embodiments.
Figure 6:
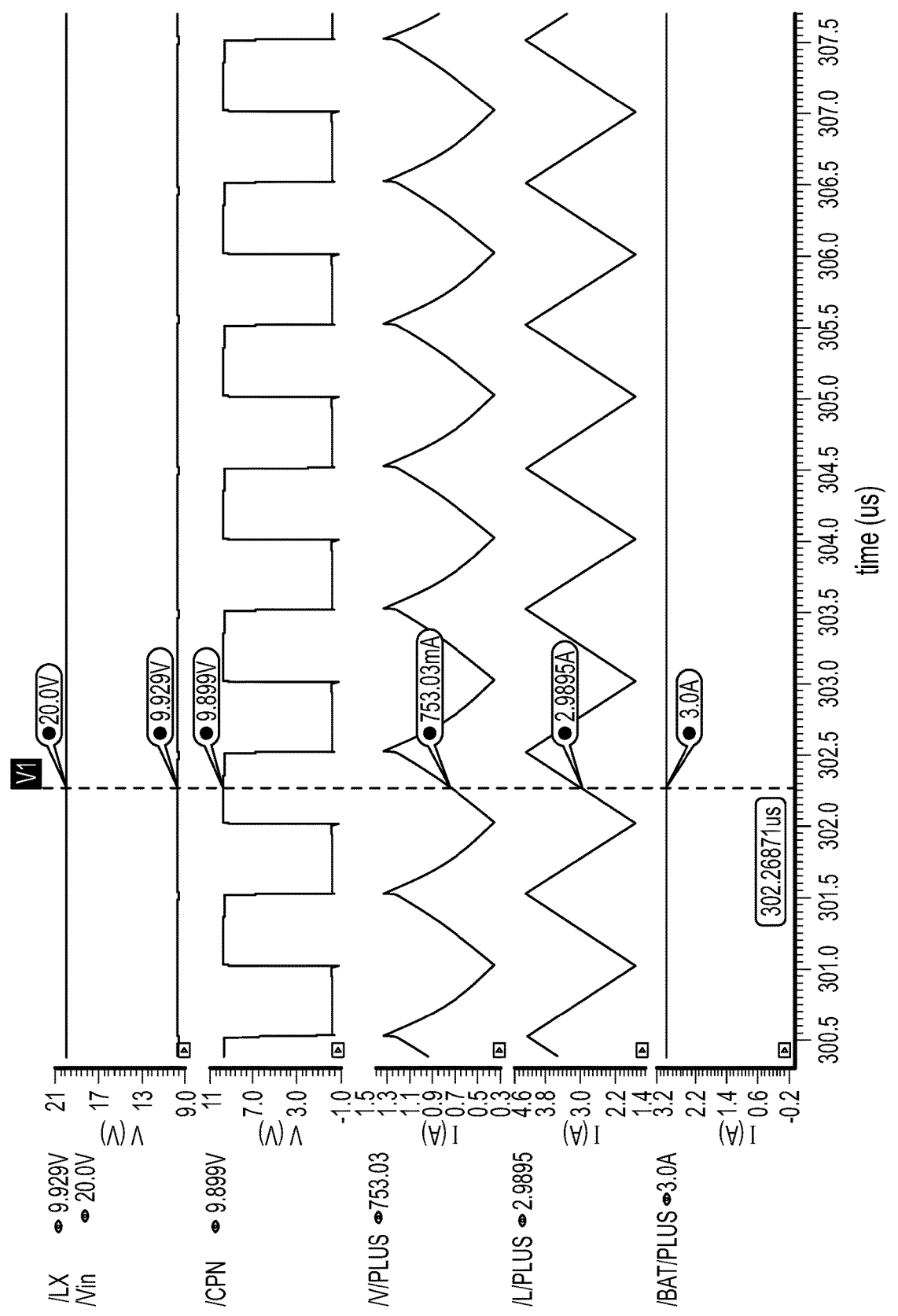
FIG. 6 illustrates a section of the signal diagram in FIG. 5 in more detail.

FIG. 4 illustrates a diagram illustrating some aspects of the circuit illustrated in FIG. 2. FIG. 5 illustrates signal traces of points in the circuit illustrated in FIG. 4, and FIG. 6 illustrates a portion of the signal traces illustrated in FIG. 5. As shown in FIG. 4, the divider circuit, including the two capacitors 211-213 and one inductor 213 may be added to the receiver module 400. In FIGS. 5-6, "/Vin" represents the input voltage from LDO 210, "/CPN" represents the voltage at the CPN node, "/V/Plus" represents the input current from LDO 210, "/L/Plus" represents the current that passes through the inductor 213, and "/BAT/Plus" represents the charging current that is fed to the battery 130.

The signal waveforms illustrated in FIGS. 5 and 6 are produced in test bench with a 1 uH inductor with 20 mhom DC-resistance (DCR). Some ringing is observed in FIGS. 5 and 6 because, in this demonstration, there is no soft start. In the diagrams shown in FIGS. 5 and 6, When Vin is 20V, the voltage at node CPN "/CPN" toggles between 10V and gnd. When the average input current "/V/plus" is around 753 mA, the average current "/L/Plus" passing through the inductor 213 is substantially similar to 3.0 A, and the loading current "/BAT/Plus" is 3.0 A. In other words, the loading current has been boosted 4 times.

The above detailed description is provided to illustrate specific embodiments of the present invention and is not intended to be limiting. Numerous variations and modifications within the scope of the present invention are possible. The present invention is set forth in the following claims.

What is claimed is:

1. A battery charging circuit, comprising:
   a low dropout regulator (LDO) for providing a voltage to a battery;
   a switch mode charger, coupled between the LDO and the battery, for feeding a first current to charge the battery; and
   a capacitor divider, coupled between the LDO and the battery, in parallel to the switch mode charger, for dividing the voltage outputted from the LDO by an integer factor and feeding a second current to charge the battery, wherein the second current is equal to the first current times the integer factor.

2. The battery charging circuit of claim 1, wherein the capacitor divider comprises:
   a first transistor switch that receives the voltage outputted from the LDO and is serially connected to a second transistor switch via a first connecting node;
   the second transistor serially connected to a third transistor switch via a second connecting node;
   the third transistor switch serially connected to a fourth transistor switch via a third connecting node; and
   the fourth transistor switch being connected to ground.

3. The battery charging circuit of claim 2, wherein the first transistor switch and the third transistor switch are controlled by a same gate voltage, and the second transistor switch and the fourth transistor switch are controlled by a reverse of the same gate voltage.

4. The battery charging circuit of claim 3, wherein the capacitor divider further comprises:
   a first capacitor coupled between the first connecting node and the third connecting node; and
   a second capacitor coupled between the second connecting node and the ground.

5. The battery charging circuit of claim 4, wherein:
   when the same gate voltage that controls both the first and the third transistor switches is set as a first value during a first part of a cycle:
      the first transistor switch and the third transistor switch are off,
      the second transistor switch and the fourth transistor switch are on, and
      the third connecting node outputs a voltage level of zero; and
   when the same gate voltage that controls both the first and the third transistor switches is set as a second value during a second part of the cycle:
      the first transistor switch and the third transistor switch are on,
      the second transistor switch and the fourth transistor switch are off, and
      the third connecting node outputs the voltage level equivalent to a ratio of the voltage outputted from the LDO.

6. The battery charging circuit of claim 5, wherein the third connecting node outputs, over a number of cycles, an average voltage level substantially similar to the voltage outputted from the LDO divided by the integer factor.

7. The battery charging circuit of claim 5, wherein the first connecting node outputs, over a number of cycles, an average voltage level substantially similar to three quarters of the voltage outputted from the LDO.

8. The battery charging circuit of claim 4, further comprising:
   an inductor coupled between the third connecting node and the battery.

9. The battery charging circuit of claim 8, wherein:
   when the switch mode charger is turned on and the capacitor divider is turned off, the inductor passes no current from the third connecting node to the battery.

10. The battery charging circuit of claim 8, wherein:
   When the switch mode charger is turned off and the capacitor divider is turned on, the inductor passes, over a number of cycles, a current substantially similar to an average current fed to the capacitor divider from the LDO times by the integer factor, from the third connecting node to the battery.

11. A method for regulating a charging voltage for a battery charging circuit, comprising:
   receiving, from a low dropout regulator (LDO), a voltage for charging a battery;
   determining whether a switch mode charger coupled between the LDO and the battery is switched on;
   when the switch mode charger is on:
      feeding, from the LDO, a first current through the switch mode charger to charge the battery; and
   when the switch mode charger is off:
      dividing, by a capacitor divider coupled between the LDO and the battery, the voltage by integer factor, and
      feeding a second current from the capacitor divider to the battery, wherein the second current is equal to the first current times the integer factor.

12. The method of claim 11, wherein the dividing, by a capacitor divider coupled between the LDO and the battery, the voltage by the integer factor comprises:
   feeding, by a controller, a gate voltage to a first transistor switch that receives the voltage outputted from the LDO,
      wherein the first transistor switch is serially connected to a second transistor switch via a first connecting node, and the second transistor is serially connected to a third transistor switch via a second connecting node;
   feeding the same gate voltage to the third transistor switch,
      wherein the third transistor switch serially connected to a fourth transistor switch via a third connecting node; and
   feeding a reverse of the gate voltage to both the second transistor switch and the fourth transistor switch,
      wherein the fourth transistor switch is connected to ground.

13. The method of claim 12, further comprising:
   turning, by setting the gate voltage as a first value during a first part of a cycle, the first transistor switch and the third transistor switch on, and the second transistor switch and the fourth transistor switch off;
   feeding a current outputted from the LDO to a first capacitor coupled between the first connecting node and the third connecting node, and a second capacitor coupled between the second connecting node and the ground;
   outputting, at the third connecting node a voltage level of zero equivalent to a ratio of the voltage outputted from the LDO.

14. The method of claim 12, further comprising:
   turning, by setting the gate voltage as a second value during a second part of the cycle, the first transistor switch and the third transistor switch off, and the second transistor switch and the fourth transistor switch on; and
   outputting, at the third connecting node a voltage level equivalent of zero.

15. The method of claim 12, further comprising:
   outputting, over a number of cycles, at the third connecting node, an average voltage level substantially similar to the voltage outputted from the LDO divided by the integer factor; and
   passing, over the number of cycles, through an inductor coupled between the third connecting point and the battery, the current substantially similar to an average current outputted from the LDO times the integer factor.

16. A system for regulating a charging voltage for a battery charging circuit, comprising:
- means for receiving, from a low dropout regulator (LDO), a voltage for charging a battery;
- means for determining whether a switch mode charger coupled between the LDO and the battery is switched on;
- means for when the switch mode charger is on, feeding, from the LDO, a first current through the switch mode charger to charge the battery; and
- means for when the switch mode charger is off:
  - dividing, by a capacitor divider coupled between the LDO and the battery, the voltage by integer factor, and
  - feeding a second current from the capacitor divider to the battery, wherein the second current is equal to the first current times the integer factor.

17. The system of claim 16, wherein the means for dividing, by a capacitor divider coupled between the LDO and the battery, the voltage by the integer factor comprises:
- means for feeding, by a controller, a gate voltage to a first transistor switch that receives the voltage outputted from the LDO,
  - wherein the first transistor switch is serially connected to a second transistor switch via a first connecting node, and the second transistor is serially connected to a third transistor switch via a second connecting node;
- means for feeding the same gate voltage to the third transistor switch,
  - wherein the third transistor switch serially connected to a fourth transistor switch via a third connecting node; and
- means for feeding a reverse of the gate voltage to both the second transistor switch and the fourth transistor switch, wherein the fourth transistor switch is connected to ground.

18. The system of claim 17, further comprising:
- means for turning, by setting the gate voltage as a first value during a first part of a cycle, the first transistor switch and the third transistor switch on, and the second transistor switch and the fourth transistor switch off;
- means for feeding a current outputted from the LDO to a first capacitor coupled between the first connecting node and the third connecting node, and a second capacitor coupled between the second connecting node and the ground;
- means for outputting, at the third connecting node a voltage level of zero equivalent to a ratio of the voltage outputted from the LDO.

19. The system of claim 18, further comprising:
- means for turning, by setting the gate voltage as a second value during a second part of the cycle, the first transistor switch and the third transistor switch off, and the second transistor switch and the fourth transistor switch on; and
- means for outputting, at the third connecting node a voltage level equivalent of zero.

20. The system of claim 19, further comprising:
- means for outputting, over a number of cycles, at the third connecting node, an average voltage level substantially similar to the voltage outputted from the LDO divided by the integer factor; and
- means for passing, over the number of cycles, through an inductor coupled between the third connecting point and the battery, the current substantially similar to an average current outputted from the LDO time the integer factor.

* * * * *